P. WEST.
DEVICE FOR CONTROLLING THE FLOW OF FLUIDS.
APPLICATION FILED APR. 22, 1920.

1,376,596.

Patented May 3, 1921.

Perry West
INVENTOR.

BY

Lewis J. Doolittle
ATTORNEY.

UNITED STATES PATENT OFFICE.

PERRY WEST, OF NEWARK, NEW JERSEY, ASSIGNOR TO ANTI-CORROSION ENGINEERING COMPANY, INC., A CORPORATION OF NEW YORK.

DEVICE FOR CONTROLLING THE FLOW OF FLUIDS.

1,376,596.    Specification of Letters Patent.    Patented May 3, 1921.

Application filed April 22, 1920. Serial No. 375,831.

*To all whom it may concern:*

Be it known that PERRY WEST, a citizen of the United States, residing at Newark, Essex County, New Jersey, has invented certain new and useful Improvements in Devices for Controlling the Flow of Fluids, of which the following is a specification.

This invention relates to a device which is adapted for use in connection with a feed or supply pipe line to provide for the introduction of a chemical solution, such as a coagulant, into the water or other fluid in an amount substantially proportional to the flow through said supply pipe line and to automatically regulate the amount of chemical solution so introduced to keep the proportion constant over wide and rapid variations in the rate of flow;

One method which may be used, in some cases, is to insert a restriction in the supply pipe line, which operates as a Venturi tube and creates a difference of pressure between the intake and outlet side thereof and, by connecting a branch pipe line leading from the intake side and back to the outlet side of the restriction in the supply pipe, a part of the flow is diverted and caused to flow through this branch pipe line. This diverted flow may be caused to pass through a chamber containing a coagulant or other chemicals which it is desired to introduce into the fluid flowing in the supply pipe line, the diverted fluid taking up the coagulant or other chemicals and forming a more or less saturated solution, as the same flows through the said chamber.

This method operates very well in cases where the variations in the volume and velocity of the fluid passing through the supply pipe line is not great but it is often desirable and necessary to provide for wide variations in the rate of flow and one difficulty found in such cases was that during the period when the rate of flow through the supply pipe line was low the difference of pressure available was not sufficient to cause the necessary diverted flow through the branch pipe line, unless the orifice or passage through the restriction were reduced to a size which would create too great a difference of pressure at higher rates of flow through the supply pipe line.

To overcome this difficulty and to provide a simple and practical device which would automatically operate under all conditions and ranges met with in actual practice and regulate or control the flow through the branch pipe line at substantially a uniform proportionate amount automatically, is the principal object of this invention.

To accomplish this result I provide a plurality of orifices in the restriction in the supply pipe line. These orifices may operate on the Venturi tube principle, but only one of the same is left open, the others being provided with valves arranged to open successively and automatically as the volume and velocity increases to permit the fluid to pass therethrough, all of which will be explained more fully hereinafter in connection with the description of the device as shown in the accompanying drawings as illustrative of one of the embodiments of the invention.

In the drawings, like parts in the several views have been given the same reference numerals.

Figure 1:
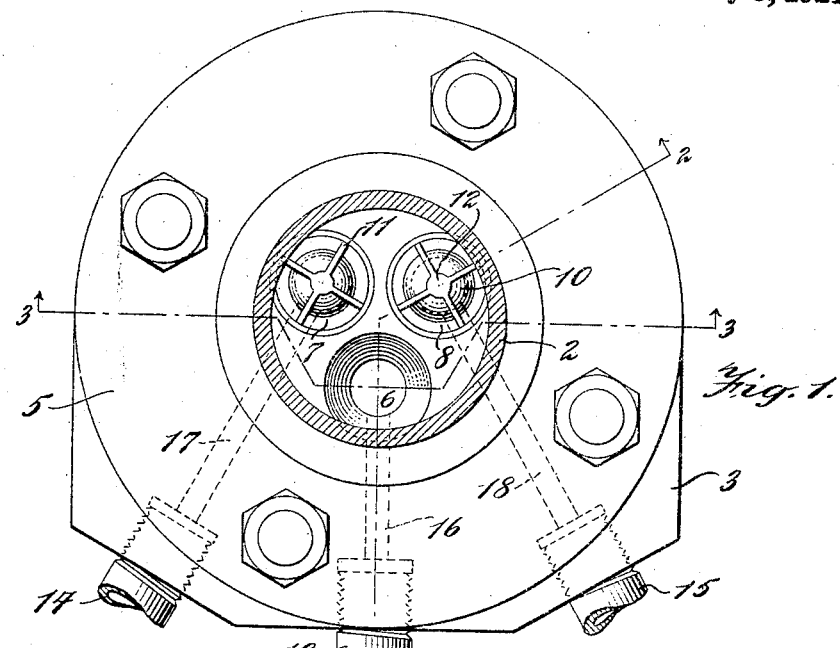
Figure 1 is a plan view of a device embodying the invention.
Figure 2:
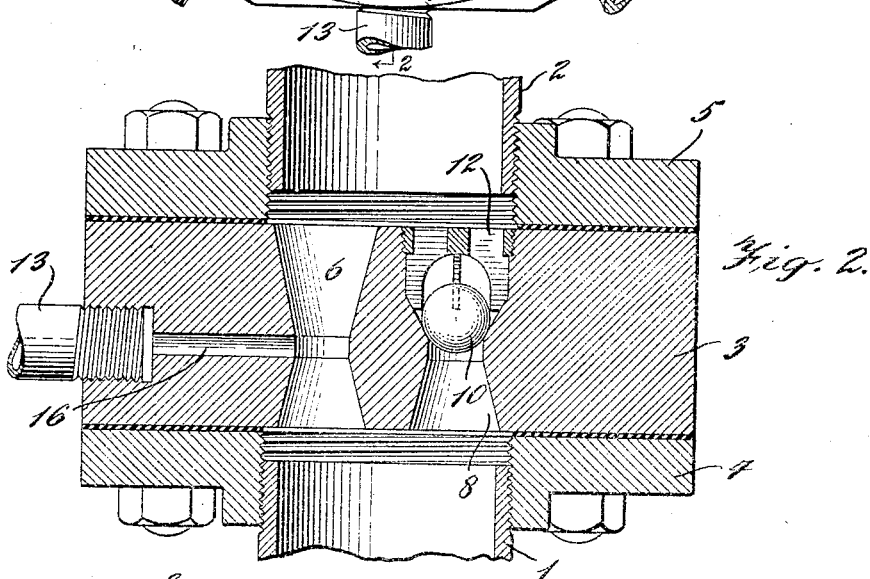
Fig. 2 is a detail sectional view on the line 2—2 of Fig. 1.
Figure 3:
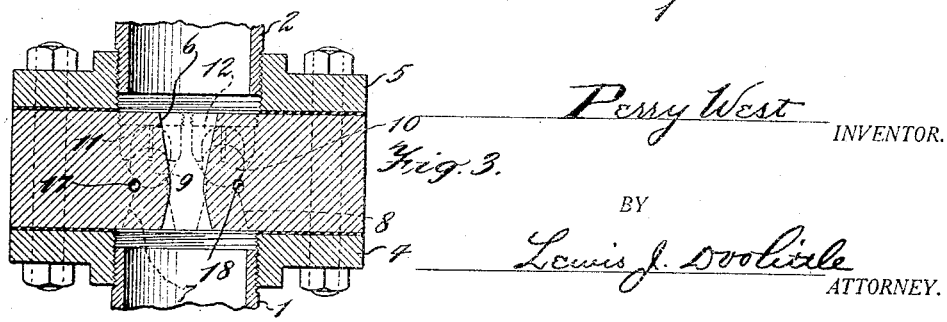
Fig. 3 is a sectional view on the line 3—3 of Fig. 1.

A supply pipe line is indicated by the pipes 1—2, through which the fluid is assumed to flow upwardly in the arrangement shown in the drawing. A restriction or resistance piece 3 is provided with pipe flange members 4 and 5, attached thereto on opposite sides thereof by means of suitable fastening bolts and having suitable gaskets interposed therebetween, as shown in Fig. 3, the supply pipes 1 and 2 being screwed into these flanges 4 and 5, respectively, in the usual manner.

The restriction or resistance piece 3 is provided with a number of conically divergent openings or orifices therethrough positioned in alinement with the supply pipes 1—2. Three of these orifices are here shown, at 6, 7, and 8, and each tapers outwardly from a small diameter near the center to a larger diameter at either end, as shown. One of these orifices, such as 6, is always open while the others are provided with ball valves 9 and 10 respectively, preferably of different size or weight, which normally seat on the upwardly diverging sides of the orifies 7 and 8, respectively, and close the same. Skeleton plugs 11 and 12 are screwed into the upper ends of the orifices 7 and 8, respectively, above the ball valves 9 and 10, to prevent the same from being carried out of the opening by the flow but permit the valves to be raised to open the orifices, the plugs being constructed with passages to permit the fluid to pass therethrough.

Branch pipes 13, 14 and 15, are attached to the resistance piece 3 and communicating passages 16, 17 and 18, extend from each of said pipes to the orifices 6, 7, and 8, respectively, as shown. The other ends of these branch pipe lines (not shown) are connected to the supply pipe 1 and provide conduits for the introduction of the chemical solution thereto.

The orifice 6 is constructed small enough to accommodate the minimum volume of fluid passing through the supply pipe 1—2 at its lowest velocity in order to produce the necessary difference of pressure to cause a part of the flow to be diverted through the branch pipe 13, by means of which the chemical solution is introduced thereto. The ball valves 9 and 10 remain seated, closing the orifices 7 and 8, until the velocity has increased to a pre-determined point, when the lighter valve 9, will be raised, opening the orifice 7 to accommodate the increased volume of fluid flowing. The branch pipe 14 provides for the additional chemical solution to be supplied for the increased volume of fluid now flowing in the supply pipe 1—2.

In the same manner, as the velocity further increases, the valve 10 is raised and the orifice 8 is opened, permitting the necessary additional solution to be introduced through the branch pipe 15.

The branch pipes 13, 14 and 15 may be joined by a suitable yoke and be connected to a single chamber for supplying the chemical solution thereto or the same may be connected to separate chambers, as desired.

It will be seen that the branch pipes 14 and 15 are inoperative until the valves 9 and 10 are opened, as just described, so that the chemical solution is always introduced in substantially an amount proportional to the volume of fluid flowing in the supply pipe 1—2.

As many changes could be made in the above construction and many apparently widely different embodiments of the invention designed without departing from the scope and spirit of the invention, as defined in the accompanying claims, it is intended that all matter contained in the above description or shown in the drawings shall be interpreted as illustrative merely of an operative embodiment of the invention and not in a limiting sense.

What I claim is:

1. A device of the class described, adapted for use in connection with a fluid supply pipe line, comprising means for diverting a part of the flow of fluid in said supply pipe line, said means including a plurality of separate means operatively controlled by the volume of fluid flowing.

2. A device of the class described, adapted for use in connection with a fluid supply pipe line, comprising automatically operating means for diverting a part of the flow of fluid in said supply pipe line, said means including a plurality of separate means operatively controlled by the volume of fluid flowing.

3. A device of the class described, adapted for use in connection with a fluid supply pipe line, comprising means for diverting a part of the flow of fluid in said supply pipe line, said means including a plurality of separate means successively operative as the volume of fluid flowing increases.

4. A device of the class described, adapted for use in connection with a fluid supply pipe line, comprising means for diverting a part of the fluid flowing in said supply pipe line, said means including a plurality of separate means each of which is operative for different volumes of fluid flowing.

5. A device of the class described, adapted for use in connection with a fluid supply pipe line, comprising means for diverting a part of the fluid flowing in said supply pipe line, said means including a resistance piece arranged to be inserted in said supply pipe line, said resistance piece having a plurality of orifices and provided with means operated by the fluid for controlling the flow therethrough.

6. A device of the class described, adapted for use in connection with a fluid supply pipe line, comprising means for diverting a part of the fluid flowing in said supply pipe line, said means including a resistance piece arranged to be inserted on said supply pipe line, said resistance piece having a plurality of orifices one of which is provided with a valve operated by the fluid when the flow is at a predetermined rate to open the same.

7. A device of the class described, adapted for use in connection with a fluid supply pipe line, comprising means for diverting a part of the fluid flowing in said supply pipe line, said means including a resistance piece arranged to be inserted in said supply pipe line, said resistance piece having a plurality of orifices one of which is always open and the others are each provided with valves operated by the fluid when the flow is at a predetermined rate to open the same.

8. A device of the class described, adapted for use in connection with a fluid supply pipe line, comprising means for diverting a part of the fluid flowing in said supply pipe line, said means including a resistance piece arranged to be inserted in said supply pipe line, said resistance piece having a plurality of orifices one of which is always open and the others are each provided with valves each operated by the fluid at different rates of flow to open the same.

9. A device of the class described, adapted for use in connection with a fluid supply pipe line, comprising a resistance piece adapted to be inserted in said pipe line and provided with a plurality of conically divergent orifices through which the fluid flows and which cause a part of the said flow to be diverted, some of said orifices being provided with ball valves of different weights which close said orifices at certain rates of flow and open the same at different rates of flow, substantially as and for the purpose specified.

In testimony whereof, the said PERRY WEST has signed his name to this specification in the presence of two subscribing witnesses, this 25th day of March, 1920.

PERRY WEST.

Witnesses:
E. M. MORALES,
L. J. DOOLITTLE.